US011269361B2

(12) United States Patent
Viega et al.

(10) Patent No.: US 11,269,361 B2
(45) Date of Patent: *Mar. 8, 2022

(54) METHOD AND APPARATUS FOR USING VELOCITY PROFILE MEASUREMENTS IN RECOVERING BITUMEN FROM A COARSE TAILINGS LINE

(71) Applicants: CiDRA Corporate Services LLC, Wallingford, CT (US); Suncor Energy Inc., Alberta (CA)

(72) Inventors: John Viega, Ellington, CT (US); Perry W. McKechnie, Fort McMurray (CA); Marek J. Dominski, Sherwood Park (CA)

(73) Assignees: CIDRA CORPORATE SERVICES INC., Wallingford, CT (US); SUNCOR ENERGY INC., Alberta (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,202

(22) Filed: Feb. 15, 2019

(65) Prior Publication Data

US 2020/0264638 A1  Aug. 20, 2020
US 2021/0382505 A9  Dec. 9, 2021

Related U.S. Application Data

(62) Division of application No. 14/345,997, filed as application No. PCT/US2012/058885 on Oct. 5, 2012, now Pat. No. 10,228,706.

(Continued)

(51) Int. Cl.
*G05D 7/06* (2006.01)
*C10G 1/04* (2006.01)
*G01F 1/74* (2006.01)

(52) U.S. Cl.
CPC .......... *G05D 7/0617* (2013.01); *C10G 1/045* (2013.01); *G01F 1/74* (2013.01)

(58) Field of Classification Search
CPC .......... G05D 7/0617; C10G 1/045; G01F 1/74
(Continued)

(56) References Cited

U.S. PATENT DOCUMENTS 4,337,396 A * 6/1982 Lauer ................. G01N 21/3563
250/255
6,354,147 B1   3/2002 Gysling et al.
6,587,798 B2 * 7/2003 Kersey ................ G01N 29/024
702/50

(Continued)

*Primary Examiner* — Chun Cao
(74) *Attorney, Agent, or Firm* — Ware, Fressola, Maguire & Barber LLP

(57) ABSTRACT

The present invention provides techniques for recovering hydrocarbon fluids in a process flow, including recovering bitumen from a coarse tailings line. The apparatus includes a signal processor that responds to signaling containing information about the presence of a hydrocarbon fluid in a process flow; and determines corresponding signaling to control the diversion of the hydrocarbon fluid from the process flow remaining based on the signaling received. The hydrocarbon fluid may be bitumen, including bitumen flowing in a course tailings line. The signal processor receives the signaling from a velocity profile meter having sensors arranged around a circumference of a process pipe containing information about a fluid flow velocity at various levels or heights within the process pipe, including a wrap-around velocity profile meter having multiple sensing arrays located radially at a top position of 0°, a bottom position of 180°, and intermediate positions 45°, 90° and 135°.

15 Claims, 4 Drawing Sheets

Related U.S. Application Data

(60) Provisional application No. 61/543,433, filed on Oct. 5, 2011.

(58) Field of Classification Search
USPC .......................................................... 700/282
See application file for complete search history.

(56) References Cited

U.S. PATENT DOCUMENTS

| | | | |
|---|---|---|---|
| 6,609,069 B2 * | 8/2003 | Gysling | G01F 1/712 |
| | | | 702/48 |
| 7,062,976 B2 | 6/2006 | Gysling et al. | |
| 7,086,278 B2 | 8/2006 | Gysling et al. | |
| 7,134,320 B2 | 11/2006 | Gysling et al. | |
| 7,165,464 B2 | 1/2007 | Gysling et al. | |
| 7,343,818 B2 | 3/2008 | Gysling et al. | |
| 7,343,820 B2 | 3/2008 | Gysling et al. | |
| 7,363,800 B2 | 4/2008 | Gysling et al. | |
| 7,367,240 B2 | 5/2008 | Gysling et al. | |
| 7,571,633 B2 | 8/2009 | Gysling et al. | |
| 8,109,127 B2 | 2/2012 | Gysling et al. | |
| 8,287,050 B2 * | 10/2012 | Watson | E21B 41/0064 |
| | | | 299/2 |
| 10,228,706 B2 * | 3/2019 | Viega | G05D 7/0617 |
| 2002/0030398 A1 * | 3/2002 | Drake | E21D 9/093 |
| | | | 299/8 |
| 2008/0133182 A1 | 6/2008 | Gysling | |
| 2008/0308384 A2 | 12/2008 | Bjornson et al. | |
| 2011/0056298 A1 * | 3/2011 | O'keefe | G01B 17/02 |
| | | | 73/622 |
| 2011/0160893 A1 * | 6/2011 | Rothman | G01F 1/712 |
| | | | 700/108 |

* cited by examiner

Figure 1

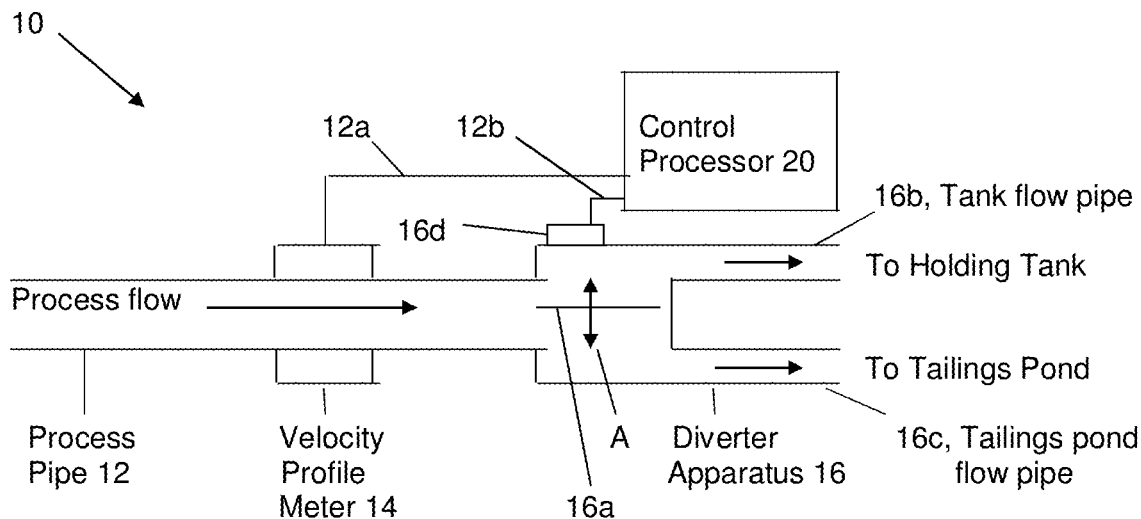

Figure 1a

Control Processor 20

A signal processor 20a configured to respond to signaling containing information about the presence of a hydrocarbon fluid in a process flow, including where the hydrocarbon fluid is bitumen flowing in a course tailings line; and determine corresponding signaling to control the diversion of the hydrocarbon fluid from the process flow remaining based at least partly on the signaling received Other signal processor devices 20b, including a memory containing a computer program, input/output devices and busing architecture

Figure 1b

Wrap Around *SONARtrac* Velocity Profiler

⇨ *SONARtrac wrap-around velocity profile meter* uses multiple sensing arrays located radially at the top position, 0º 45º, 90º, 135º and the bottom of the pipe Figure: 3a Figure: 3b Figure: 3c

METHOD AND APPARATUS FOR USING VELOCITY PROFILE MEASUREMENTS IN RECOVERING BITUMEN FROM A COARSE TAILINGS LINE

CROSS-REFERENCE TO RELATED APPLICATIONS

This application is a divisional application of, and claims benefit to, parent application Ser. No. 14/345,997, filed 20 Mar. 2014, which corresponds to international patent application serial no. PCT/US2012/058885, filed 5 Oct. 2012, that claims benefit to provisional patent application Ser. No. 61/543,433, filed 5 Oct. 2011 (WFVA/CiDRA file nos. 712-2.360/CCS-73), which are all incorporated by reference in their entirety.

BACKGROUND OF THE INVENTION

1. Field of Invention

This invention relates to technique for recovering hydrocarbon fluids in a process flow; and more particularly to recovering bitumen from a coarse tailings line.

2. Description of Related Art

In a coarse tailings line that goes from a separation vessel (such as a gravity separation vessel or a PSV) to a tailings pond in an oilsands separation plant, trace amounts of bitumen of up to 1% or more may be present in the waste (tailings) line that goes to a tailings pond.

The coarse tailings line is a slurry transport process, which means that water is used to transport the waste to the tailings pond. The waste will include the various sands, clays, water and other natural materials that were separated from the bitumen in the separation plant. In the tailings pond, the solids and sediment settle out, leaving behind the process and naturally occurring water. Any leftover bitumen in the coarse tailings will be discharged to the tailings pond, presenting a potential environmental hazard, as well as a loss of valuable hydrocarbon content.

The pumping of the tailings in the coarse tailings line will cause additional conditioning of the tailings mixture leading to the potential separation of any bitumen in the tailings from the sand and clays in the tailings. This separated bitumen will tend to "float" along the top of the tailings pipe.

One known method to capture the bitumen in the tailings line is to use a skimmer at the very end of the tailings line prior to the tailings pond to skim off the bitumen in the pipe with the use of a diverter plate. The skimmer plate skims off the bitumen and directs it to a tank, with the remaining tailings going to the tailings pond.

The issue with this method is that there is no way to know how much bitumen is present in the coarse tailings line. With a fixed diverter plate, in some instances, too much water will be captured when little bitumen is present, and in other cases, too little bitumen will be captured, with significant amounts of bitumen being directed to the tailings pond.

In view of this, there is a need in the industry to provide a way to know or determine how much bitumen is present in the coarse tailings line. Moreover, there is also a need in the industry to provide a way to capture more bitumen and less water from the process flow, as well as to reduce the amount of bitumen being directed to the tailings pond.

SUMMARY OF THE INVENTION

The present invention provides new techniques for recovering hydrocarbon fluids in a process flow; and more particularly to recovering bitumen from the process flow including that flowing in a coarse tailings line.

According to some embodiments of the present invention, the apparatus may comprise a signal processor configured to:
  respond to signaling containing information about the presence of a hydrocarbon fluid in a process flow; and
  determine corresponding signaling to control the diversion of the hydrocarbon fluid from the process flow remaining based at least partly on the signaling received.

The present invention may also include one or more of the following features:

According to some embodiments of the present invention, the hydrocarbon fluid may include, or take the form of, a fluid containing bitumen, including bitumen flowing in a process pipe such as a course tailings line.

According to some embodiments of the present invention, the signal processor may be configured to receive the signaling from a velocity profile meter having sensors arranged or configured around a circumference of a process pipe, the signaling containing information about a fluid flow velocity at various levels or heights within the process pipe. The velocity profile meter may be a wrap-around velocity profile meter that uses multiple sensing arrays, including where the multiple sensing arrays are located radially at a top position of 0°, a bottom position of 180°, and intermediate positions 45°, 90° and 135°. According to some embodiments of the present invention, the apparatus may also include the velocity profile meter.

According to some embodiments of the present invention, the signal processor may be configured to provide the corresponding signaling to control a diverter that diverts the hydrocarbon fluid from the process flow remaining, including where the hydrocarbon fluid is flowing in a coarse tailings line and the hydrocarbon fluid contains bitumen. According to some embodiments of the present invention, the apparatus may also include diverter apparatus configured in relation to the process pipe, and the diverter apparatus may include the diverter and a diverter controller that controls the diversion of the hydrocarbon fluid from the process flow remaining based at least partly on the corresponding signaling received.

According to some embodiments of the present invention, the signal processor may be is configured to provide the corresponding signaling to control a fixed diverter, so that a process pipe connecting the fixed diverter to a holding tank can be closed off when no hydrocarbon fluid is detected, and opened when the hydrocarbon fluid is detected, including where the hydrocarbon fluid is flowing in a coarse tailings line and the hydrocarbon fluid contains bitumen. According to some embodiments of the present invention, the diverter apparatus may include the fixed diverter and the diverter controller controls the fixed diverter based at least partly on the corresponding signaling received.

According to some embodiments of the present invention, the signal processor may be configured to provide the corresponding signaling to control a variable diverter, so that the position of the variable diverter can be adjusted based upon a detected amount of hydrocarbon fluid in the process flow, including where the hydrocarbon fluid is flowing in a coarse tailings line and the hydrocarbon fluid contains bitumen. According to some embodiments of the present invention, the diverter apparatus may include the variable diverter and the diverter controller controls the variable diverter based at least partly on the corresponding signaling received.

According to some embodiments of the present invention, the signal processor may be configured to provide the corresponding signaling to control an adjustable skimmer blade that can be adjusted to levels and degrees of hydrocarbon fluid in the process flow, including where the hydrocarbon fluid is flowing in a coarse tailings line and the hydrocarbon fluid contains bitumen. According to some embodiments of the present invention, the diverter apparatus may include the adjustable skimmer blade and the diverter controller controls the adjustable skimmer blade based at least partly on the corresponding signaling received.

According to some embodiments of the present invention, the apparatus may also include the velocity profile meter that is, or takes the form of, a wrap-around velocity profile meter having multiple sensing arrays, including where the multiple sensing arrays are located radially at a top position of 0°, a bottom position of 180°, and intermediate positions 45°, 90° and 135°, and that is also configured in a closed-loop fashion with the adjustable skimmer blade.

The Method

According to some embodiments, the present invention may take the form of a method including steps for responding with a signal processor to signaling containing information about the presence of a hydrocarbon fluid in a process flow; and determining with the signal processor corresponding signaling to control the diversion of the hydrocarbon fluid from the process flow remaining based at least partly on the signaling received.

The method may also include one or more steps for implementing the features set forth herein.

One advantage of the present invention is that it provides a way to determine how much of a hydrocarbon such as bitumen may be present in a process flow such as that in a coarse tailings line. Moreover, it also provides a way to capture more of the hydrocarbon such as bitumen and less water from the process flow such as that in a coarse tailings line, as well as to reduce the amount of the hydrocarbon such as bitumen being directed to the tailings pond.

BRIEF DESCRIPTION OF THE DRAWING

The drawing includes FIGS. 1-6, which are not necessarily drawn to scale, as follows:

FIG. 1 includes FIG. 1a, which is a block diagram of apparatus configured for recovering a hydrocarbon fluid in a process flow, including to recovering bitumen from a coarse tailings line, according to some embodiment of the present invention; and includes FIG. 1b, which is a block diagram of a control processor that forms part of the apparatus shown in FIG. 1a, according to some embodiment of the present invention.

DETAILED DESCRIPTION OF BEST MODE OF THE INVENTION

FIG. 1

Figure 2:
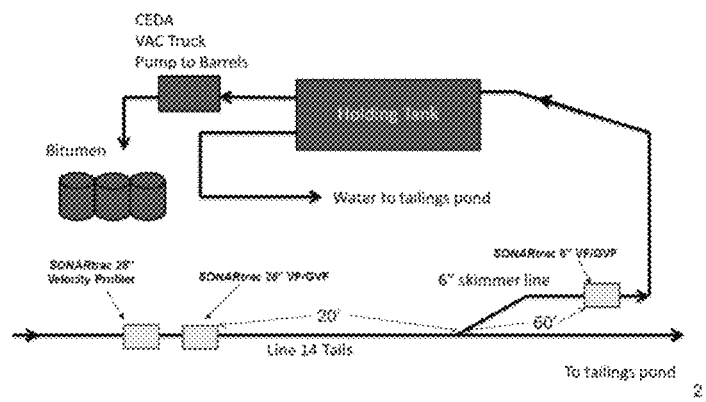
FIG. 2 is a block diagram of apparatus or a system for recovering a hydrocarbon fluid in a process flow, including recovering bitumen from a coarse tailings line, arranged in relation to a holding tank, according to some embodiment of the present invention.

FIG. 1a shows the apparatus generally indicated as 10 according to some embodiments of the present invention. The apparatus 10 may include one or more of the following: a process pipe having a process flow flowing therein; one or more VF/GVF velocity profile meter 14 configured or arranged on the process pipe 12; diverter apparatus 16 also configured or arranged in relation to the process pipe 12 with a diverter 16a for selectively diverting some part of the process flow to a tank flow pipe 16b and the remaining part of the process flow to a tailings pond flow pipe 16c; and a control processor 20.

The control processor 20 may include a signal processor 20a configured to: respond to signaling containing information about the presence of a hydrocarbon fluid in a process flow; and determine corresponding signaling to control the diversion of the hydrocarbon fluid from the process flow remaining based at least partly on the signaling received. The signaling containing information about the presence of the hydrocarbon fluid in the process flow may be received, e.g., from the one or more VF/GVF velocity profile meter 14, which determines the presence of the hydrocarbon fluid in the process flow based at least partly on the fluid flow velocity at the various levels or heights sensed within the process pipe 12.

By way of example, the hydrocarbon fluid may include, or take the form of a fluid containing bitumen, including where the process pipe 12 is a coarse tailings line and the fluid contains bitumen flowing in the coarse tailings line. However, the scope of the invention is intended to include determining the presence of other types or kind of hydrocarbons, in other types or kind of hydrocarbon fluids, in other types or kinds of process flows, either now known or later developed in the future.

Figure 3:
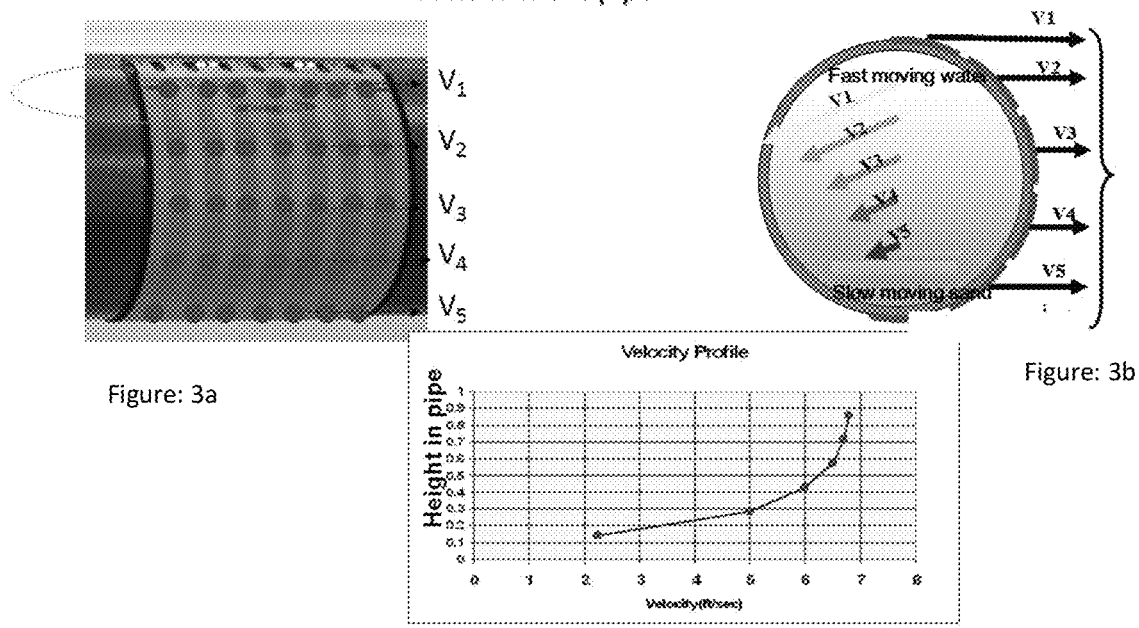
FIG. 3 includes FIG. 3a, which is a side view of a velocity profile meter configured on a process pipe, according to some embodiment of the present invention; includes FIG. 3b, which show a longitudinal view of the velocity profile meter configured on the process pipe in FIG. 3a, according to some embodiment of the present invention; and includes FIG. 3c, which is a velocity profile in the form of a graph of the height in the process pipe versus velocity (ft/sec) of the process flow in the pipe.

According to some embodiments of the present invention, the one or more velocity profile meter 14 may be configured with sensors arranged or configured around a circumference of the process pipe 12, consistent with that shown in FIGS. 3a and 3b.

The signal processor 20a may be configured to provide the corresponding signaling to a diverter controller 16d to control the diverter 16a that diverts the hydrocarbon fluid from the process flow remaining. A person skilled in the art would appreciate and understand how to implement or configure without undue experimentation such diverter apparatus 16 having such a diverter 16a and diverter controller 16d in such a process pipe 12 in order to perform the diversion functionality set forth herein consistent with the present invention.

FIGS. 2-7

FIG. 2 shows a process pipe arranged in relation to a holding tank, according to some embodiments of the present invention. The process pipe is shown, by way of example, as a 28" process pipe, although the scope of the invention is not intended to be limited to any particular dimension thereof. The process pipe may be configured with one or more SONAR-based velocity profile meter, e.g., including a SONARtrac 28" velocity profile meter that is known in the art and developed by the assignee of the instant patent application. The SONARtrac 28" velocity profile meter is configured to conform to the 28" process flow, consistent with that set forth in FIG. 3. The process pipe is also configured with another SONAR-based meter, e.g., including a SONARtrac 28" VF/VGF meter that is also known in the art and developed by the assignee of the instant patent application. The SONAR-based velocity profile meter and/or SONARtrac 28" VF/VGF meter may be configured to sense the process flow in the process pipe and provide the signaling containing information about the fluid flow velocity at the various levels or heights within the process pipe.

The inventors have found that in a tailings line containing trace amounts of bitumen, the bitumen at the top of the pipe will transport at a slower velocity than the more dense water in the center of the pipe, but faster than the coarse solids at the bottom of the pipe. Based on this understanding, the SONAR-based 28" velocity profile meter and/or SONARtrac 28" VF/VGF meter may be configured to determine the fluid flow velocity at various levels or heights within the process pipe, and provide the signaling containing information about the same. The process flow in whole or in part flowing in the process pipe may be diverted to the holding tank via a skimmer line or to a tailings pond. The skimmer line is shown, by way of example, to be a 6" skimmer line, although the scope of the invention is not intended to be limited to any particular dimension thereof. According to the present invention, the information about the fluid flow velocity at various levels or heights within the process pipe from the SONAR-based 28" velocity profile meter and/or SONARtrac 28" VF/VGF may be used to control the diversion of the hydrocarbon fluid, such as bitumen, from the process flow remaining. In other words, the hydrocarbon fluid, such as the fluid containing bitumen, may be diverted along the skimmer line to the holding tank, while the process flow remaining (substantially not containing the bitumen) may to provided to the tailings pond. In FIG. 2, by way of example, the SONARtrac 28" VF/VGF is shown configured about 20' from the diverter point where the process line is coupled to the skimmer line diversion, and the skimmer line diversion is configured about 60' from a 6" VF/VGF configured to provide a further measurement of the diverted hydrocarbon fluid flowing in the skimmer line to the holding tank. In FIG. 2, the skimmer line is understood to be configured with appropriate diverter apparatus at the diverter point having a skimmer consistent with that set froth in relation to FIG. 1a herein.

In FIG. 2, the holding tank is configured to receive the diverted hydrocarbon fluid, such as fluid containing bitumen, to provide water to the tailings pond, and also to provide recovered hydrocarbon, such as bitumen, to a CEDA VAC truck pump to barrels, as shown. The barrels containing the recover hydrocarbon, such as bitumen, may be transported so that the recovered hydrocarbon, such as bitumen, may be appropriately used or sold as needed in the marketplace.

FIGS. 3a and 3b shows an implementation of the velocity profile meter, having sensors arranged or configured around the circumference of a process pipe, so that the fluid flow velocity at various levels or heights within the process pipe can be determined. For example, in a horizontal process pipe that contains a flowing slurry of liquid and solids, because of gravity and density effects, the solids will tend to flow along the bottom of the pipe and liquids will tend to flow along the middle and top of the pipe. In FIGS. 3a, 3b, by way of example, the velocity profile meter may be, or take the form of, a wrap-around velocity profile meter that uses multiple sensing arrays, including where the multiple sensing arrays are located radially at a top position of 0°, a bottom position of 180°, and intermediate positions 45°, 90° and 135°.

Figure 4:
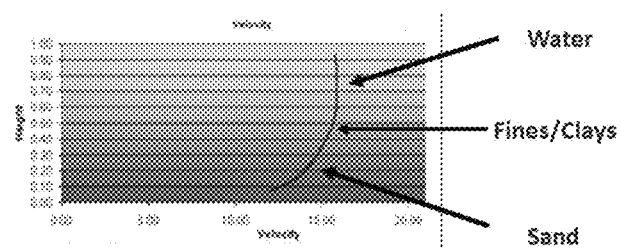
FIG. 4 is a graph of height versus velocity that shows a typical "J"-shaped velocity profile curve in a coarse tailings slurry in a process pipe.

FIG. 4 includes a graph that shows a typical expected velocity profile of a slurry containing a combination of solids (such as sand and clays) with water flowing in a process pipe. The graph in FIG. 4 shows the slower moving solids at the bottom of the process pipe, with faster moving water near the top of the process pipe. The vertical axis represents the nominal pipe height, the horizontal axis, and the velocity.

Figure 5:
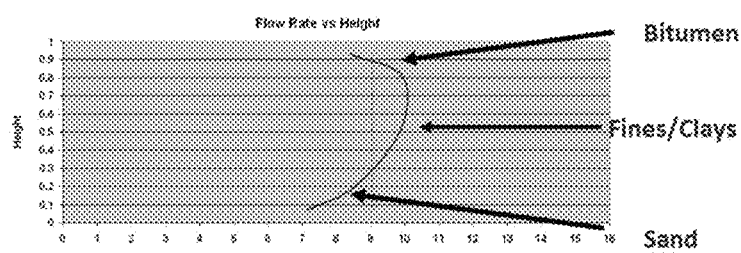
FIG. 5 is a graph of height versus rate that shows an inverted backwards "C velocity type curve.

It is understood that in a process pipe that contains a combination of solids (such as sands and clays) with water and bitumen, the bitumen will tend to "float" to the top of the process pipe and move at a slow velocity than the water in the center of the process pipe, but at a faster velocity than the solids at the bottom of the process pipe. FIG. 5 includes, by way of example, a graph that shows an example of a process pipe containing solids, water and bitumen.

Figure 6:
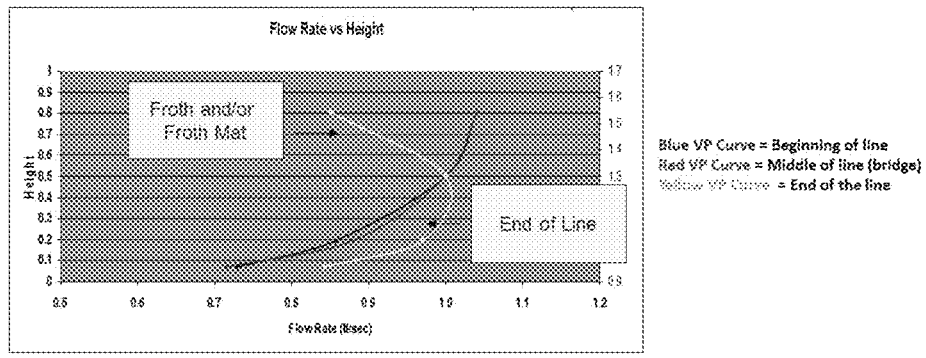
FIG. 6 is a graph of height versus rate flow (ft./sec.) that shows an indication of the presence of froth at the top of a pipe.
Figure 7:
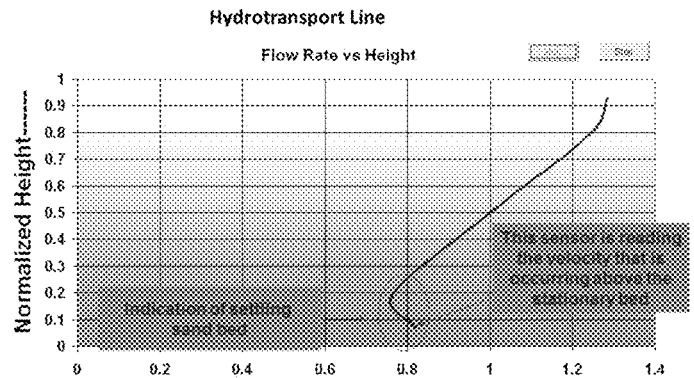
FIG. 7 is a graph of normalized height versus rate flow that shows an indication of the presence of sand forming at the bottom of a pipe.

FIGS. 6 and 7 include, by way of example, graphs that show a velocity profile at the beginning, middle and end of a coarse tailings line.

According to some embodiments of the present invention, and consistent with that disclosed herein, the velocity profile meter may also be used to detect a stationary sand bed forming in a pipe, leading to a sand-out or clog of the pipe.

The present invention may include the diverter controller 16d (FIG. 1a) to be used to control a diverter 16a arranged in the process pipe, such as process pipe 12. The diverter 16a may include, or take the form of, a fixed diverter. In the case of the fixed diverter, the pipe connecting the fixed diverter 16a to a holding tank can be closed off when no bitumen is detected, and opened when bitumen is detected.

Alternatively, the diverter 16a may include, or take the form of, a variable diverter. The variable diverter can be utilized, and the position of the diverter adjusted, based upon the detected amount of bitumen in, e.g., the coarse tailings line. For example, the velocity profile meter or system can be used to optimize bitumen recovery in a closed-loop fashion with an adjustable skimmer blade that will adjust to the levels and degree of bitumen separation in the process pipe as indicated by the velocity profile meter.

While the present invention is shown and described for use in a coarse tailings line, the present invention may be used in any process where there is the possibility of a flow containing solids, water and hydrocarbon fluids, to detect the presence of the hydrocarbon fluid, and also, if desired, control the diversion of the hydrocarbon fluid from the remaining flow using a skimmer or some other method or technique.

Control/Signal Processor 20, 20a and Diverter Controller 16d

By way of example, and consistent with that described herein, the functionality of the control processor 20, signal processor 20a and diverter controller 16d may be implemented using hardware, software, firmware, or a combination thereof, although the scope of the invention is not intended to be limited to any particular embodiment thereof.

In a typical software implementation, the signal processor 20a may be, or take the form of, one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality set forth in the signal processor 20a, as well as other functionality described herein without undue experimentation. For example, a person skilled in the art would be able to program such a microprocessor-based implementation without undue experimentation for the implementation of the control processor 20 and the signal processor 20a to respond to the signaling containing information about the presence of the hydrocarbon fluid in the process flow; and determine the corresponding signaling to control the diversion of the hydrocarbon fluid from the process flow remaining based at least partly on the signaling received, consistent with that disclosed herein. Moreover, a person skilled in the art would be able to program such a microprocessor-based implementation without undue experimentation for the diverter controller 16d to respond the corresponding signaling and control the diverter 16a and the diversion of the hydrocarbon fluid from the process flow remaining based at least partly on the corresponding signaling received, consistent with that disclosed herein. The scope of the invention is not intended to be limited to any particular implementation using technology now known or later developed in the future. Moreover, the scope of the invention is intended to include the signal processor being a stand alone module, as shown, or in the combination with other circuitry for implementing another module.

It is also understood that the signal processor 20a may include one or more other modules, components, circuits, or circuitry 20b for implementing other functionality associated with the apparatus that does not form part of the underlying invention, and thus is not described in detail herein. By way of example, the one or more other modules, components, circuits, or circuitry generally indicated as element 20b may include random access memory, read only memory, input/output circuitry and control, data and address buses for use in relation to implementing the signal processing functionality of the signal processor 20a.

SONAR-based Entrained Air Meter and Volumetric Flow (VF) and Gas Void Fraction (GVF) Technology By way of example, the velocity profile meter technology is known in the art, and may include, or take the form of, one or more of the SONAR-based entrained air meter disclosed, e.g., in whole or in part in U.S. patent application Ser. No. 12/991,636, filed 1 Feb. 2011 (WFVA/CiDRA file nos. 712-2.322-1/CC-0962), as well as, by way of example, the SONAR-based technology disclosed in one or more of U.S. Pat. Nos. 6,609,069; 7,062,976; 7,086,278; 7,134,320; 7,165,464; 7,363,800; 7,343,818; 7,343,820; 7,367,240; 7,571,633 and 8,109,127, all of which are incorporated by reference in their entirety. The velocity profile meter technology may also be implemented using Volumetric Flow (VF) technology and/or Gas Void Fraction (GVF) technology that is known in the art, that was developed by the assignee of the present application, or its parent, predecessor or related company or companies and that is disclosed in other patents and patent applications. The velocity profile meter may also be implemented using Volumetric Flow (VF) technology and/or Gas Void Fraction (GVF) technology that forms part of a product series known and marketed under the trademark "SONARtrac," as well as in a product known as a GVF-100 meter, that were developed by the assignee of the present application or its parent, predecessor or related company or companies. See also U.S. Pat. Nos. 6,354,147; 6,609,069; and 6,587,798, which disclose other techniques for fluid parameter measurement in pipes using acoustic pressures, that are all also incorporated by reference in their entirety.

THE SCOPE OF THE INVENTION

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method for processing a hydrocarbon fluid in a process flow in a course tailings line, comprising:
   responding, with a signal processor, to signaling containing information about fluid flow velocities sensed at various levels or heights in a hydrocarbon fluid containing bitumen in a process flow in a course tailings line, the signaling containing information about at least a first fluid flow velocity sensed at or near the top of the course tailings line, and at least one other fluid flow velocity sensed at some other location below the top of the course tailings line; and
   determining, with a signal processor, corresponding signaling to control the diversion of a portion of the hydrocarbon fluid flowing at or near the top of the course tailings line from the process flow to one flow pipe for further processing, and a remaining portion of the hydrocarbon fluid flowing below the top of the course tailings line from the process flow to another flow pipe, based at least partly on the signaling received.

2. A method according to claim 1, wherein the method comprises receiving, with the signal processor, the signaling from a velocity profile meter having sensors arranged or configured around a circumference of the process pipe.

3. A method according to claim 2, wherein the method comprises configuring the velocity profile meter as a wrap-around velocity profile meter that uses multiple sensing arrays, including where the multiple sensing arrays are located radially at a top position of 0°, a bottom position of 180°, and intermediate positions 45°, 90° and 135°.

4. A method according to claim 1, wherein the method comprises providing, with the signal processor, the corresponding signaling to control a diverter that diverts the hydrocarbon fluid from the process flow.

5. A method according to claim 4, wherein the method comprises configuring diverter apparatus in relation to the course tailings line, and controlling the diverter with a diverter controller that controls the diversion of the hydrocarbon fluid from the process flow, based at least partly on the corresponding signaling received.

6. A method according to claim 1, wherein the method comprises providing, with the signal processor, the corresponding signaling to control a fixed diverter, so that a tank flow pipe connecting the fixed diverter to the holding tank can be closed off when no hydrocarbon fluid is detected, and opened when the hydrocarbon fluid is detected.

7. A method according to claim 6, wherein the method comprises configuring diverter apparatus in relation to the process pipe, and controlling the fixed diverter with a diverter controller that controls the diversion of the hydrocarbon fluid from the process flow remaining based at least partly on the corresponding signaling received.

8. A method according to claim 1, wherein the method comprises providing, with the signal processor, the corresponding signaling to control a variable diverter, so that the position of the variable diverter can be adjusted based upon a detected amount of hydrocarbon fluid in the process flow.

9. A method according to claim 8, wherein the method comprises configuring the diverter apparatus in relation to the process pipe, and controlling the variable diverter with a diverter controller that controls the diversion of the hydrocarbon fluid from the process flow, based at least partly on the corresponding signaling received.

10. A method according to claim 1, wherein the method comprises providing, with the signal processor, the corresponding signaling to control an adjustable skimmer blade that can be adjusted to levels and degrees of hydrocarbon fluid in the process flow.

11. A method according to claim 10, wherein the method comprises configuring diverter apparatus in relation to the process pipe, and controlling the adjustable skimmer blade with a diverter controller that controls the diversion of the hydrocarbon fluid from the process flow, based at least partly on the corresponding signaling received.

12. A method according to claim 10, wherein the method comprises configuring the velocity profile meter as a wrap-around velocity profile meter having multiple sensing arrays, including where the multiple sensing arrays are located radially at a top position of 0°, a bottom position of 180°, and intermediate positions 45°, 90° and 135°, and that is configured in a closed-loop fashion with the adjustable skimmer blade.

13. A method according to claim 1, wherein the method comprises:
  configuring the process pipe as a course tailings flow pipe;
  configuring the one flow pipe as a tank flow pipe for providing the hydrocarbon fluid diverted to a holding tank for further processing; and
  configuring the another flow pipe as a tailings pond flow pipe for providing the remaining fluid to a tailings pond.

14. A method for processing a hydrocarbon fluid in a process flow flowing in a course tailings line, comprising:
  arranging or configuring a velocity profile meter having sensors around a circumference of a course tailings line to sense fluid flow velocities sensed at various levels or heights in a hydrocarbon fluid containing bitumen in a process flow in the course tailings line, and provide signaling containing information about at least a first fluid flow velocity sensed at or near the top of the course tailings line, and at least one other fluid flow velocity sensed at some other location below the top of the course tailings line;
  respond, with a control processor having signal processor, to the signaling, determining, with the control processor, corresponding signaling to control the diversion of a portion of the hydrocarbon fluid flowing at or near the top of the course tailings line from the process flow to one flow pipe for further processing, and a remaining portion of the hydrocarbon fluid flowing below the top of the course tailings line from the process flow to another flow pipe, based upon the signaling received; and
  configuring a diverter, having an adjustable skimmer blade that can be adjusted to levels and degrees of hydrocarbon fluid in the process flow, to respond to the corresponding signaling, and move the adjustable skimmer blade to a level or height within the process pipe to divert corresponding portions of the hydrocarbon fluid from the process flow into either a holding tank flow pipe or a tailings pond flow pipe depending on the level or height of the adjustable skimmer blade.

15. A method according to claim 14, wherein the method comprises configuring the velocity profile meter as a wrap-around velocity profile meter that uses multiple sensing arrays, including where the multiple sensing arrays are located radially at a top position of 0°, a bottom position of 180°, and intermediate positions 45°, 90°, 135°, 225°, 270°, 315°.

* * * * *